United States Patent

Luzsicza

[15] 3,658,314

[45] Apr. 25, 1972

[54] ELASTOMERIC FLUID SHOCK ABSORBER

[72] Inventor: Steven O. Luzsicza, Huron, Ohio
[73] Assignee: Clevite Corporation
[22] Filed: Aug. 18, 1969
[21] Appl. No.: 850,807

[52] U.S. Cl. ..................267/121, 248/358 AA, 248/358 R, 267/3, 267/64 R, 267/152, 267/35
[51] Int. Cl. .........................F16f 1/50, F16f 5/00, F16f 9/10
[58] Field of Search........................267/35, 63, 152, 157, 141, 267/118, 121, 122, 124, 140, 151, 153, 35, 64 B, 3, 35, 64 R; 248/358 AA, 358 R

[56] References Cited

UNITED STATES PATENTS

| | | | |
|---|---|---|---|
| 2,705,118 | 3/1955 | Beck | 248/10 |
| 3,254,883 | 6/1966 | Morgan | 267/141 |
| 986,969 | 3/1911 | Escalante et al. | 267/35 |
| 1,029,462 | 6/1912 | Rife | 267/35 |
| 2,056,106 | 9/1936 | Kuhn | 267/35 |
| 2,147,990 | 2/1939 | Richter | 267/35 X |
| 2,818,249 | 12/1957 | Boschi | 267/35 |
| 3,424,448 | 1/1969 | Chak Ma | 263/35 |

FOREIGN PATENTS OR APPLICATIONS 620,144 3/1949 Great Britain ..................267/141

Primary Examiner—Arthur L. La Point
Assistant Examiner—Howard Beltran
Attorney—Edward E. Sachs

[57] ABSTRACT

Two coaxially disposed rigid tubes are interconnected by a radially secured elastomeric spring member with a fluid chamber formed in the inner tube as well as in the outer tube. The elastomeric member is effective upon relative axial movement between the two tubes to change the volumetric relationship between the two chambers by causing fluid to flow through differently sized orifices within the inner tube. An elastomeric compression bumper is disposed axially between the tubes and upon movement between the tubes of a certain magnitude, the bumper progressively covers some or all of the orifices. The elastomeric spring member provides one or more dissimilar spring rates. Additional load carrying capacity is provided by a gas pressure chamber within the inner tube.

17 Claims, 10 Drawing Figures

INVENTOR.
STEVEN O. LUZSICZA

BY

ATTORNEY 3,658,314

ELASTOMERIC FLUID SHOCK ABSORBER

The invention relates generally to a suspension system for freight or passenger carrying vehicles and, more particularly, to an elastomeric device which combines the function of a conventional shock absorber and a metal spring.

In the prior art numerous attempts have been made to combine a shock absorber with a compression spring. In such devices, which usually consist of two hydraulically interconnected units, rubber springs have already been suggested in conjunction with fluid shock dampening chambers. These suspension devices require intricate sealing means and separate damping plates which are disposed within the fluid chamber as well as a diaphragm for confining the fluid within one of the chambers and for traveling with the damper plate. In such devices the elastomeric spring member is deflected by the hydraulic medium. Consequently any loss of fluid will have a deleterious effect upon the proper functioning of the spring.

The device in accordance with this invention simplifies, to a considerable extent, the spring and shock absorber unit known in the art. The device is self-contained. A number of functions are carried out by a single elastomeric member. The rubber-like member is arranged to function (1) as a force transmitting piston, (2) as a diaphragm effective to change the volumetric relationship of interconnected fluid chambers, and (3) as an elastomeric spring.

The concept embodied in the basic construction permits the elimination of the conventional stationary damper plate, the diaphragm and, moreover, causes the static and dynamic load of the vehicle to be brought to bear directly upon a resilient member which has the capacity to absorb and to pass on minor as well as major dynamic and static loads directly upon the fluid chambers which are used for shock damping purposes.

The device in accordance with this invention utilizes an inner and an outer tube with a fluid reservoir or chamber being established in each tube. The inner tube is provided with a plurality of passageways for permitting fluid intercourse between the aforementioned chambers.

An elastomeric spring member is radially mounted between the tubes, for stressing in the shear mode, in such a manner that any axial displacement of the inner tube in respect to the outer tube causes a hydraulic pressure differential between the chambers. The fluid flow between the chambers or reservoirs, is restricted by primary and secondary orifices. The basic functional distinguishing characteristic between the two types of orifices is that they are de-activated or activated at different spring deflections so that the flow rate through the orifices is in direct relationship to the magnitude of the impact forces.

An elastomeric compression bumper serves to automatically meter the fluid flow through orifices by virtue of pressure engagement with the flow restricting face of the inner member. The elastomeric compression bumper has the additional function of avoiding metal contact between the inner and the outer tube.

The invention facilitates the construction of an improved combined shock absorber and spring device having a reduced number of individual components and provides a variable damping effect by absorbing shock generated energy, due to low or high impact loads, by forcing the fluid through selected orifices at a flow rate corresponding to the damping requirements.

While not essential to this invention, the device may be constructed for heavy duty service by forming the elastomeric spring member in two parts, with one part thereof having a spring rate which is dissimilar from the other part.

It is therefore the primary object of this invention to provide a self-contained elastomeric spring and shock absorber of simplified construction.

It is another object of this invention to provide an elastomeric spring and shock absorber in which an elastomeric spring member functions as a spring, piston and diaphragm.

It is a further object of this invention to provide an elastomeric compression bumper for preventing metal-to-metal contact between the inner and the outer rigid member.

It is a still further object of this invention to provide an elastomeric spring and shock absorber in which the inner tube is provided with orifices of different diameters and a bumper is effective to selectively deactivate certain orifices to regulate the flow rate, and the absorption of energy, through the orifices that remain active.

It is another object of this invention to provide an elastomeric spring and shock absorber which has increased reliability over those known in the art by virtue of the reduction of the individual components.

It is another object of this invention to provide an elastomeric spring and shock absorber in which the elastomeric spring member is formed of two sections, each section having a spring rate dissimilar from the other section.

It is another object of this invention to provide a spring and shock absorber which can be operated bidirectionally.

An aspect of the present invention resides in the provision of an elastomeric spring and shock absorber which includes an inner load transmitting tubular member and an outer member placed at least in part around the inner member with each member being provided with a fluid chamber, and fluid passageways for connecting the two chambers. An elastomeric insert or spring member is secured to and between tubular members and is stressed in shear in response to relative axial movement between the tubular members which causes the insert to be effective to vary the volumetric relationship between the fluid chambers.

Another and additional aspect of the present invention resides in the provision of an elastomeric compression bumper disposed within the chamber of the outer member and arranged for shock absorbing contact with the inner tubular member and for progressively covering the fluid passageways between the fluid chambers in order to control the fluid flow rate therebetween.

Another and additional aspect of the present invention resides in the provision of an elastomeric spring and shock absorber of the type above described in which the elastomeric spring member is composed of more than one part in which each part has a dissimilar spring rate and provides increased lateral stability.

For a better understanding of the present invention, together with other and further objects thereof, reference is had to the following description taken in connection with the accompanying drawings, and its scope will be pointed out in the appended claims.

Figure 1:
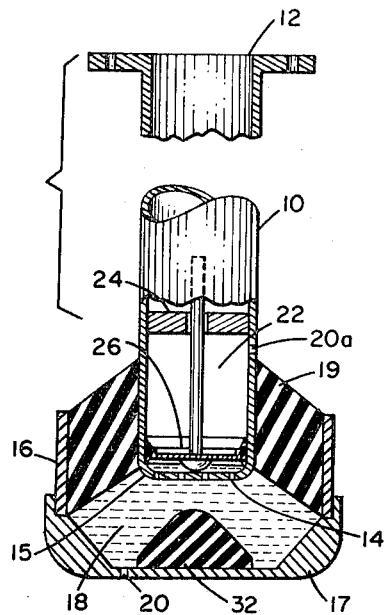
FIG. 1 is, essentially, a longitudinal cross-section of an elastomeric spring and shock absorber in accordance with this invention illustrating the device when not under load.
Figure 1A:
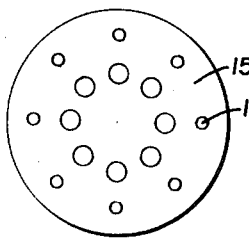
FIG. 1a shows a plan view of the bottom of the inner tubular member illustrating the distribution of the orifices.

Turning now the the drawings, there is shown in FIG. 1 a load transmitting inner tube 10 composed of a rigid material, such as metal, terminating at its upper end with a radially flanged portion 12 which in normal operation is secured to the sprung mass, such as the body or frame of a vehicle, not shown. The lower end of the tube, as illustrated in the drawing, is closed by a fluid metering plate 15 provided with a plurality of differently sized fluid passageways or orifices 14. The orifices 14 in plate 15 are arranged in circular array with the number, size and location of orifices in each array and the number of circular arrays depending upon the particular requirement for a given application. In the drawing, see FIG. 1a four orifices are shown to indicate that the metering plate is provided with two circular arrays of orifices 14, the array close to the center having orifices of larger diameter comparative to those orifices of the outer array which are appreciably smaller. While thus numerous orifices are indicated, the invention will also be operative with a single orifice depending, again, upon a particular application.

The tube 10 is coaxially surrounded by a rigid outer tube 16 which is open at one end and closed at the other by a base 17 axially spaced from the plate 15 to form a fluid pressure chamber 18 therebetween. The tube 16 is connected or secured to the unsprung mass of the vehicle, not shown, such as an axle.

A spring insert 19 of elastomeric material, such as rubber or rubber-like substances, is radially secured to and between the inner and the outer tube 10 and 16, respectively, to prevent any relative movement at the contact surfaces, i.e., between the rubber-like material and the metal surfaces, and to provide a fluid-tight seal and diaphragm between the two tubular members relative to chamber 18.

Preferably, the elastomeric spring insert 19 is adhesively bonded to the contact area of the inner and outer tube 10, 16. The metal contact surfaces are coated with a rubber-to-metal bonding adhesive and thereafter the insert 19 is placed into position and vulcanized in situ.

As will be appreciated from the drawing, the elastomeric insert 19 has a frusto-conical cross-section in its un-stressed position, as illustrated in FIG. 1, and the transverse cross-section, not shown, is preferably circular but, in any event, such so as to be complementary to the contacting surfaces of the inner and outer tubular members 10, 16 to fluid seal chamber 18. The arrangement of insert 19 between tubes 10 and 16 is such that upon axial movement between the tubes the insert is essentially stressed in the shear mode although some compression does take place under various conditions.

It will be noted from the above description that the inner tube 10 connects solely to the elastomeric insert 19 and has no rigid connection, except as otherwise described with respect to the radial flange 12. The fluid chamber 18 has a normally closed port opening 20 to permit the chamber 18 to be filled with a suitable fluid pressure medium such as silicon oil having a viscosity which will maintain consistency at temperature extremes and is chemically compatible with the elastomeric material.

The inner tube 10 forms a fluid chamber 22 between orifices 14 and reservoir cover 24. A piston 26 is movably disposed within chamber 22 to separate liquid in the reservoir portion 22' from gaseous substances in subchamber 22" which may be provided within the inner tube 10 and between the reservoir cover 24 and the piston 26. The use of gaseous material under pressure in chamber 22" serves to increase the load capacity of the device and/or functions as a vehicle leveler. The piston 26 is guided within the chamber 22 by means of a longitudinally extending guide rod 28 secured to the piston and extending axially through the reservoir cover 24. The reservoir cover 24 is suitably sealed by a bushing against the axially movable rod 28 to prevent gaseous material from escaping therethrough. Around the periphery of the piston 26 there is secured, preferably by adhesive bond, a seal 30 which slidably bears against the wall surface of the inner tube 10. Upon an increase in the pressure differential between the gaseous chamber 22" and reservoir 22' the seal 30 is self-actuated in that the outwardly flaring lips thereof are pressed against the wall of tube 10.

Disposed within the fluid pressure chamber 18 and adhesively secured onto the bottom of the end plate 17, of outer tube 16, is an elastomeric bumper 32 which serves to maintain the inner and the outer tube apart at all times and functions as a spring which is auxiliary to the primary spring embodied in elastomeric insert 19. The bumper 32 also provides automatic fluid flow control or metering which is actuated by predetermined impact forces when acting upon the elastomeric member 19 due to relative axial movement, or substantially axial movement, between the inner and the outer tube 10 and 16, respectively.

As has been noted above, the inner tube 10 is provided at one end with the plate 15 having orifices 14. The orifices 14 and the bumper 32 are spaced relative to each other, as shown in FIG. 1, and are located in suitable juxtaposition with one facing the other. In the preferred embodiment, the bumper 32 has a configuration similar to a truncated cylinder, with the side surfaces sloping towards the central axes of the inner tube 10 and the width of the apex of the sloped bumper 32 approximating the distance between the larger sized orifices 14 of one circular array.

Figure 2:
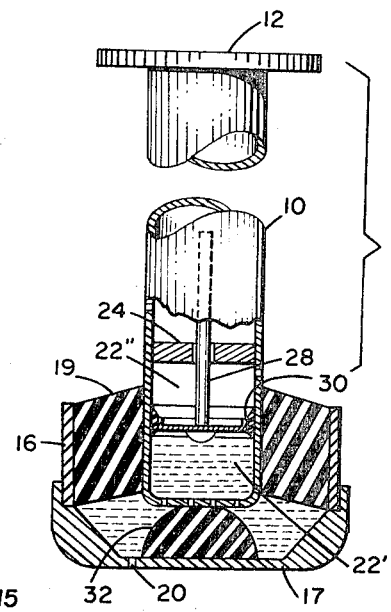
FIGS. 2 to 4 are views similar to FIG. 1 showing the device in progressively different operating stages.

In operation, the static load bears upon the rubber-like insert 19 through inner tube 10, with the elastomeric insert 19 being assisted under certain load conditions by the fluid within the fluid pressure chamber 18. An increase in the magnitude of either the dynamic or static load against the elastomeric insert 19, causes the inner tube to move further downwardly against the stationary outer tube as shown in FIG. 2. This movement causes the bumper to bear against portions of the metering plate 15 containing orifices 14. In response to further dynamic or static loads, the bumper will progressively cover all of the orifices. More specifically, as shown in FIG. 2, initially when starting from a low load condition, only the centrally located orifices are closed and de-activated which, as explained above, have a diameter which is greater than the diameter of the adjacent orifices so that fluid is forced from chamber 18 into reservoir 22 at a fluid velocity which is higher than if all of the orifices had remained open whereby greater friction is generated and, in turn, more energy is absorbed. This absorption of energy causes a damping effect and thus functions to absorb shocks.

Figure 3:
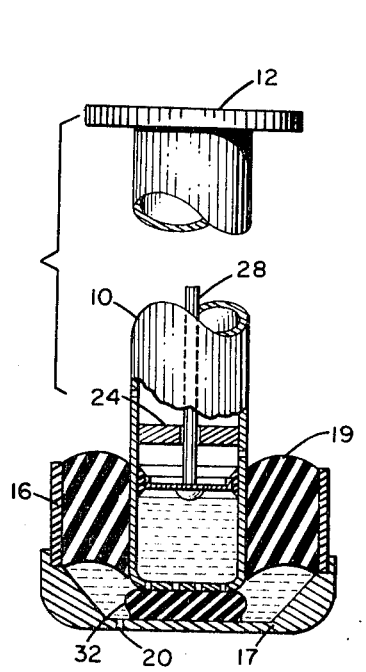
Figure 4:
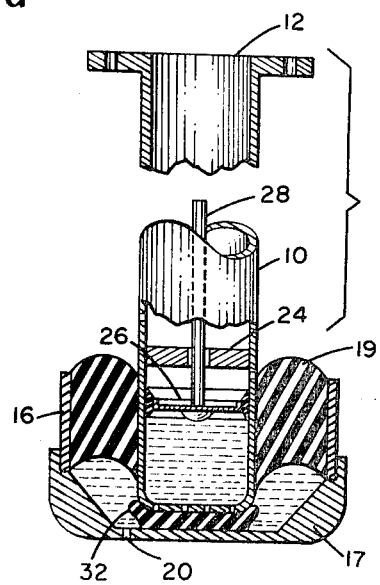

FIGS. 3 and 4 illustrate that in response to additional application of dynamic or static loads the bumper eventually closes off all fluid communication between the chambers 18 and 22 through orifices 14. While performing this fluid flow control function, the bumper 32 simultaneously functions also as an auxiliary spring, effective to keep the tubes apart.

It will be appreciated that a change in the volumetric relationship between the chambers 18 and 22 is also effected without the involvement of bumper 32. This will occur with any relative axial movement between the inner and the outer tube 10 and 16, respectively, which has the effect of causing the frusto-conical configuration of the elastomeric insert 19 to be altered initially into an almost cylindrical shape as shown in FIG. 3 and thereafter to an inverse frusto-conical shape as shown in FIG. 4. In each of these sequential steps, until the orifices are closed, a change in the volumetric relationship between the chambers occurs as a consequence of which shock energy is absorbed and dampening is effected.

In the operation of all embodiments, above and below described, the fluid from chamber 22' flows normally, partly either by gravity or pressure variation, into the lower chamber 18 where the device is vertically installed. A port opening may be provided to chamber 22 to fill the same. The sub-chamber 22" may be pressurized as noted in which case the opening 20a to atmosphere is closed.

Figure 5:
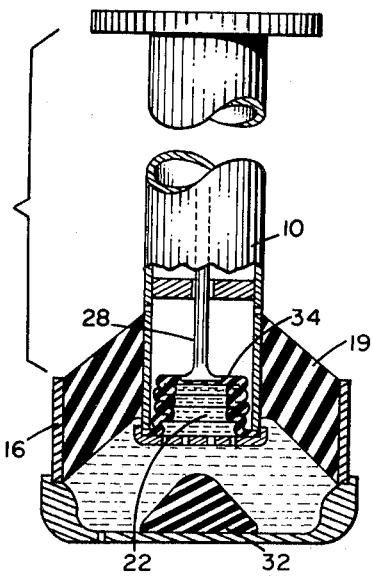
FIG. 5 is a view similar to FIG. 1 showing a modification of the elastomeric spring and shock absorber utilizing a bellows-type fluid separator.
Figure 6:
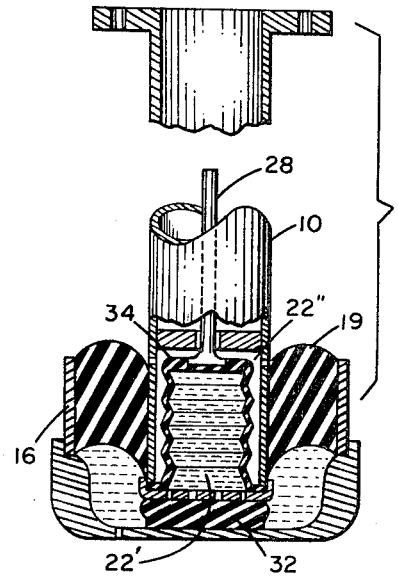
FIG. 6 is a view similar to FIG. 5 illustrating the device under substantial static and/or dynamic loads.

Referring now to FIGS. 5 and 6 in which the same reference characters are utilized for similar above described parts, there is shown a bellows 34 for separating the fluid of reservoir portion 22' from the gaseous chamber portion 22". The guide rod 28 is secured to the closed end of the bellows 34 to guide the axial movement thereof. FIG. 6 is comparable to FIG. 4 in that it illustrates the spring and shock absorber under heavy static and dynamic load conditions with the bellows being considerably expanded. It should be noted that the bellows 34 does not serve as a load carrying member and is merely a reservoir normally not under pressure.

Figure 7:
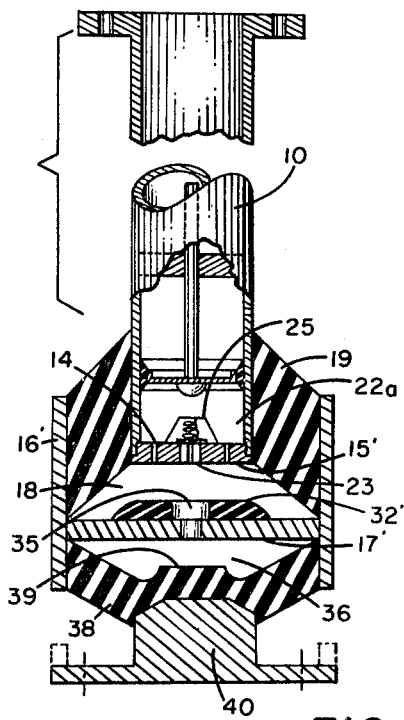
FIG. 7 is a cross-sectional view of the spring and shock absorber illustrating a dual spring rate elastomeric spring system.
Figure 8:
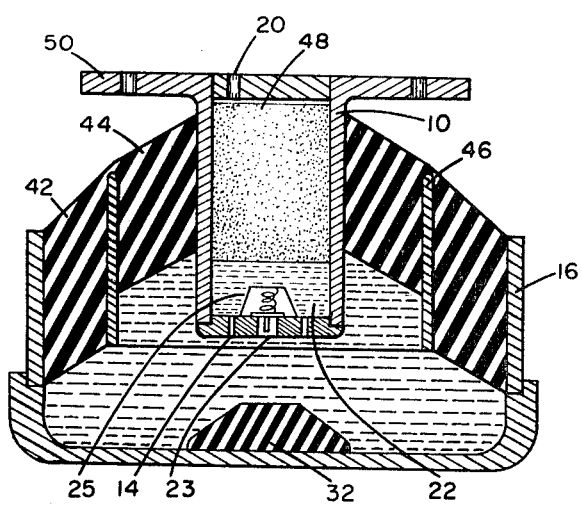
FIG. 8 is a view similar to FIG. 7 showing a further modification of a dual spring rate elastomeric member.

In order to broaden the spring capacity and to permit the spring to function between very high and very low loads, the invention is modified as shown in FIGS. 7 and 8 by adding to the system an elastomeric spring member, for establishing a dual spring rate.

More specifically, referring now to FIG. 7, there is shown an inner tube 10 and an elastomeric insert 19 substantially as before described, in which the bumper 32' is secured to a fluid separating and valving member 17' extending transversely within the outer tube, intermediate to its axial ends, and remote from the elastomeric insert 19. An axially extending fluid passageway 35 is provided through these members 17' and 32' to establish a second fluid chamber 36 within the outer tube 16'. The volume of the chamber 36 is structurally defined by the axially extending tube 16', the transversely extending valving member 17' and at the bottom by a second elastomeric insert 38 which has a configuration which is substantially inverse from that of insert 19 with the exception that the axially extending portion is solid and serves as a bumper 39 for shock absorbing purposes and to shut off the fluid flow through orifice 35. The spring rate of insert 38 is substantially softer than the spring rate of insert 19. The circumference of the elastomeric insert 38 is adhesively secured to the inner wall of tube 16' and to a stationary support plate 40 which bears against the outside surface of the elastomeric insert 38.

The valving member 17' also functions as a spring rate control plate to protect the elastomeric insert 38 against overstress.

Figure 7A:
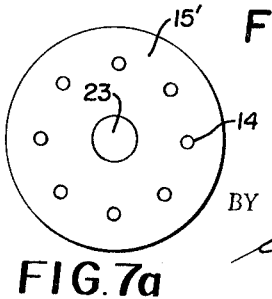
FIG. 7a shows a plan view of the bottom of the inner tubular member illustrating the distribution of the orifices.

The metering plate 15' is provided with an outer circular array of orifices 14 see FIG. 7a and a central, relatively large, orifice 23 into which extends a check valve 25. The check valve permits flow of fluid at a predetermined pressure only in the direction from pressure chamber 18' to reservoir 22a, but not vice versa.

The bumper 39 closes the passageway 35 in response to relative axial movement between the outer tubular member 16' and the inner member 10.

FIG. 8 shows a further modification of the spring and shock absorber in which the elastomeric spring member is adapted to provide a dual rate spring deflection. The spring and shock absorber is substantially similar to the device shown in FIG. 1 except that the frusto-conical elastomeric insert 19 is composed of two integrally formed, concentrically arranged sections 42, 44 which have a substantially similar wall thickness and are joined together only at one central part thereof. Interposed between the two elastomeric sections 42, 44 is a rigid tube 46. Sections 42 and 44 are adhesively secured to tube 46 to prevent any relative movement between the contact surfaces. The elastomeric sections 42, 44 are composed, in the preferred embodiment, of the same material, although for certain applications, rubber-like material of dissimilar spring rate may be utilized. The intermediate member 46 is formed of a rigid material, such as metal, and has thus a modulus of elasticity which is appreciably greater than the equivalent modulus of the elastomeric material. In the embodiment illustrated in FIG. 8 and herein described as having a spring rate (42, 44) composed of the same material, the parts 42, 44 and 46 are dimensioned in such a manner so that the contact area between rubber sections 42 and adjacent tubes 46 and 16 is significantly greater than the contact area between the elastomeric portion 44 and the adjacent contact wall areas of tubes 46 and 10.

It will be appreciated that a direct relationship exists between the bonding contact area and the degree of deflection which can be imparted to the individual sections (42, 44). With an increase in contact area there is a corresponding decrease in the deflection of the elastomeric material, with a consequently relatively higher spring rate. Conversely, in the case of a smaller contact area, the deflection of the elastomeric material is greater and a softer spring rate can be established.

Additionally, the position of tube 46 relative to the vertical axis of the device and the wall thickness of sections 42 and 44 also influences the spring rate and must therefore be chosen to satisfy the required characteristics.

The flange 50 also serves to limit the extent of deflection of part 44, i.e. when contact is made between the flange 50 and the upper end of the intermediate tube 46.

From the foregoing, it will be obvious that section 44 provides a relatively soft spring rate under most dynamic conditions and section 42 a relatively hard spring rate. The flange 50 of tube 10, in addition to its effect on spring rate, prevents overstressing by engagement thereof with intermediate tube 46, in response to excessive axial movement by the tubes 10 and 16.

FIG. 8 discloses, additionally, a modification which may be utilized in conjunction with any of the above described embodiments in that a plastic-like cellular body 48 of polyurethane foam or the like is disposed within the chamber 22" to serve as a substitute for a piston arrangement 26, 28, 24. The open cell body minimizes fluid foaming at high fluid velocity to assure constant viscosity.

The utilization of cellular body 48 in lieu of piston arrangement 26, 28 and 24 converts the embodiments shown in FIGS. 1 to 4 from a bi-directionally operable spring and shock absorber into a uni-directionally operable device.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Elastomeric spring and shock absorber, comprising in combination:
    a rigid inner tubular member forming a fluid chamber, and a rigid outer tubular member placed coaxially around the inner member and having a rigid closure laterally across its longitudinal axis;
    partition means movably disposed within the chamber of said inner member in response to action of the fluid to vary the size of the inner chamber;
    an elastomeric spring insert secured to and between said members forming a fluid chamber in the outer member;
    said inner tubular member including between said chambers a rigid structure, fluid control means for metering the flow of fluid between said chambers in response to relative axial movement between the inner and outer member, whereby said spring insert is stressed predominantly in the shear mode and simultaneously the volumetric relationship between said chambers is varied;
    and an elastomeric compression bumper seated on said rigid closure within the chamber of the outer member arranged for shock absorbing contact with said rigid structure and engagement with said fluid control means of said inner member.

2. Elastomeric spring and shock absorber according to claim 1, wherein said partition means comprises a bellows, the open end of which is secured to the inner member proximate to the location of the fluid control means.

3. Elastomeric spring and shock absorber according to claim 1, wherein the partition means within the inner member for sub-dividing the chamber thereof is a plastic-like cellular insert which is effective to significantly restrict the flow of fluid within the compartments of the chamber.

4. Elastomeric spring and shock absorber according to claim 1, wherein said insert has a substantially frusto-conical configuration and is substantially radially disposed between the inner and the outer member.

5. Elastomeric spring and shock absorber according to claim 4, wherein said elastomeric insert is divided radially into an inner and outer section; and an axially extending tubular member disposed between the sections and substantially concentrically between the inner and outer tubular members.

6. Elastomeric spring and shock absorber according to claim 5, wherein said inner and outer sections have dissimilar elastomeric spring rates.

7. Elastomeric spring and shock absorber according to claim 1, wherein said fluid control means comprises a plurality of fluid passageways extending between said chambers; and said elastomeric bumper is located adjacent to said passageways.

8. Elastomeric spring and shock absorber according to claim 7, wherein said passageways are of different diameters.

9. Elastomeric spring and shock absorber according to claim 8, wherein the diameter of the passageways located proximate to the central axis of the inner member is greater than the diameter of passageways located more remote from said axis.

10. Elastomeric spring and shock absorber according to claim 9, wherein said bumper has a configuration sloping toward the central axis of the inner member.

11. Elastomeric spring and shock absorber according to claim 10, wherein the width of the apex of the sloped bumper approximates the distance between the larger sized passageways.

12. Elastomeric spring and shock absorber according to claim 11, wherein upon relative axial movements between said members the position of said bumper first closes the centrally located passageways and upon additional movement of said members sequentially closes all of the remaining passageways.

13. Elastomeric spring and shock absorber according to claim 1, wherein said partition means is a reciprocable piston, the axial end face of which is transversely disposed within the inner member, and slidable sealing means secured on the circumference of the piston for sliding fluid seal contact with the inner wall of the inner tubular member.

14. Elastomeric spring and shock absorber according to claim 13, and a guide rod arrangement connected to the piston.

15. Elastomeric spring and shock absorber, comprising in combination:
   a rigid inner tubular member forming a fluid chamber,
   an open ended rigid outer tubular member placed coaxially around the inner member and having a rigid closure, provided with an orifice, extending laterally across the longitudinal axis of the outer member;
   partition means movably disposed within the chamber of said inner member in response to action of the fluid to vary the size of the inner chamber;
   an elastomeric spring insert secured to and between said members forming a fluid chamber in the outer member;
   said inner tubular member including between said chambers a rigid structure, fluid control means for metering the flow of fluid between said chambers in response to relative axial movement between the inner and outer member, whereby said spring insert is stressed predominantly in the shear mode and simultaneously the volumetric relationship between said chambers is varied;
   an elastomeric compression bumper, having an orifice, seated on said rigid closure within the chamber of the outer member arranged for shock absorbing contact with said rigid structure of said inner member and in alignment with the orifice of said closure;
   a fluid separating and valving member extending transversely within and across said outer tubular member and remote from the open end;
   and an elastomeric member secured across said open end and adjacent to said separating member for establishing therebetween a second enclosed fluid chamber within the outer tube whose volume is changeable upon movement of the elastomeric member;
   and fluid metering means on said separating member for controlling the flow of fluid between the two chambers of said outer tubular member.

16. Elastomeric spring and shock absorber according to claim 15, and an auxiliary elastomeric compression bumper secured on said separating member facing the inner member.

17. Elastomeric spring and shock absorber according to claim 15, wherein said elastomeric member comprises a bumper portion effective to control the fluid flow through the fluid metering means.

* * * * *